United States Patent
Li

(10) Patent No.: US 9,769,705 B2
(45) Date of Patent: Sep. 19, 2017

(54) METHOD AND APPARATUS FOR IMPLEMENTING DECENTRALIZED CLUSTERING MECHANISM

(71) Applicant: Huawei Technologies Co., Ltd., Shenzhen (CN)

(72) Inventor: Dejian Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 185 days.

(21) Appl. No.: 14/851,204

(22) Filed: Sep. 11, 2015

(65) Prior Publication Data

US 2016/0007234 A1 Jan. 7, 2016

Related U.S. Application Data

(63) Continuation of application No. PCT/CN2014/073232, filed on Mar. 11, 2014.

(30) Foreign Application Priority Data

Mar. 11, 2013 (CN) .......................... 2013 1 0076705

(51) Int. Cl.
*H04W 4/00* (2009.01)
*H04W 28/26* (2009.01)
(Continued)

(52) U.S. Cl.
CPC .......... *H04W 28/26* (2013.01); *H04B 7/0617* (2013.01); *H04W 40/244* (2013.01);
(Continued)

(58) Field of Classification Search
CPC ........... H04W 72/0446; H04W 74/002; H04W 48/12; H04B 7/0617
See application file for complete search history.

(56) References Cited

U.S. PATENT DOCUMENTS 7,240,088 B2 * 7/2007 Block ................. H04L 67/1002
707/999.01
9,313,738 B2 * 4/2016 Sinha ................. H04W 52/0229
(Continued)

FOREIGN PATENT DOCUMENTS

| CN | 102196470 A | 9/2011 |
|---|---|---|
| CN | 102726080 A | 10/2012 |

(Continued)

OTHER PUBLICATIONS

"Draft Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications—Amendment 3: Enhancements for Very High Throughput in the 60 GHz Band," IEEE P802.11 ad/D8.0, pp. 1-667, Institute of Electrical and Electronics Engineers, New York, New York (May 2012).

(Continued)

*Primary Examiner* — Raj Jain
(74) *Attorney, Agent, or Firm* — Leydig, Voit & Mayer, Ltd.

(57) ABSTRACT

A method for implementing a decentralized clustering mechanism includes: reserving, by a first wireless device located on a first channel, multiple first scheduled service periods from a first data transfer interval; switching, by the first wireless device, to a second channel within the first scheduled service periods, and transmitting a probe frame over the second channel, where the probe frame includes a cluster probe information element; reserving, by the first wireless device, multiple second scheduled service periods from a second data transfer interval according to timing information in the cluster probe information element; when a response frame from a second wireless device is received within the second scheduled service periods, identifying, by (Continued)

the first wireless device, whether an empty beacon scheduled service period exists; and if exists, transmitting, by the first wireless device, a beacon frame within the empty beacon scheduled service period.

18 Claims, 12 Drawing Sheets

(51) Int. Cl.
  *H04W 72/04* (2009.01)
  *H04B 7/06* (2006.01)
  *H04W 72/12* (2009.01)
  *H04W 40/24* (2009.01)
  *H04W 56/00* (2009.01)
  *H04W 74/00* (2009.01)
  *H04W 36/06* (2009.01)

(52) U.S. Cl.
  CPC ..... *H04W 56/001* (2013.01); *H04W 72/0446* (2013.01); *H04W 72/12* (2013.01); *H04W 36/06* (2013.01); *H04W 74/002* (2013.01)

(56) References Cited

U.S. PATENT DOCUMENTS

| | | | |
|---|---|---|---|
| 2010/0157955 A1* | 6/2010 | Liu | H04W 72/0446 370/336 |
| 2011/0154039 A1 | 6/2011 | Liu et al. | |
| 2011/0199966 A1 | 8/2011 | Cordeiro et al. | |
| 2015/0071278 A1 | 3/2015 | Cordeiro et al. | |
| 2015/0382200 A1* | 12/2015 | Li | H04L 5/001 370/336 |
| 2016/0007234 A1* | 1/2016 | Li | H04W 72/12 370/329 |

FOREIGN PATENT DOCUMENTS

| | | |
|---|---|---|
| CN | 103118406 A | 5/2013 |
| WO | WO 2012121676 A1 | 9/2012 |

OTHER PUBLICATIONS

"IEEE Standard for Information technology—Telecommunications and information exchange between systems; Local and metropolitan area networks—Specific requirements; Part 11: Wireless LAN Medium Access Control (MAC) and Physical Layer (PHY) Specifications; Amendment 3: Enhancements for Very High Throughput in the 60 GHz Band," IEEE Std 802.11 ad-2012, pp. i-598, Institute of Electrical and Electronics Engineers, New York, New York (Dec. 28, 2012).

"IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput," IEEE Std 802.11n-2009, pp. i-502, Institute of Electrical and Electronics Engineers, New York, New York (Oct. 29, 2009).

"IEEE Standard for Information technology—Telecommunications and information exchange between systems—Local and metropolitan area networks—Specific requirements; Part 15.3: Wireless Medium Access Control (MAC) and Physical Layer (PHY) Specifications for High Rate Wireless Personal Area Networks (WPANs); Amendment 2: Millimeter-wave-based Alternative Physical Layer Extension," IEEE Std 802.15.3c-2009, pp. i-187, Institute of Electrical and Electronics Engineers, New York, New York (Oct. 12, 2009).

"High Rate 60 GHz PHY, MAC and PALs," Standard ECMA-387, $2^{nd}$ Edition, pp. i-288, ECMA International, Geneva, Switzerland (Dec. 2010).

Yee et al., "New Techniques Proposal-Spatial Frequency Sharing and BSS Management," IEEE802.11-10/0443r3, PowerPoint, Institute of Electrical and Electronics Engineers, New York, New York (May 2010).

Li et al., "A Cluster Based On-demand Multi-Channel MAC Protocol for Wireless Multimedia Sensor Networks," IEEE International Conference on Communications, pp. 2371-2376, Institute of Electrical and Electronics Engineers, New York, New York (2008).

\* cited by examiner

| Information element ID | Length | 1.08/2.16 Coexistence Information field | Request Token | SP Offset | SP Space | SP Duration | Repetition Count |
|---|---|---|---|---|---|---|---|

FIG. 4

| Information Request | 2.16 GHz Intolerant | 1.08 GHz Width Request | Reserved |
|---|---|---|---|

FIG. 5

| Sequence | Information |
|---|---|
| 1 | Category |
| 2 | Public Action |
| 3 | Cluster probing |

FIG. 6

| Cluster Request | Cluster Report | Schedule Present | Traffic Scheduling Constraint Present | Extended Centralized PCP/AP Cluster Policy Enforced | Extended Centralized PCP/AP Cluster Policy Present | Cluster Channel | Reserved |
|---|---|---|---|---|---|---|---|
| | | | | | | | |

FIG. 8

| IE ID | Length | Request Token | Next BTI Offset | Reported Clustering Control |
|---|---|---|---|---|

FIG. 10

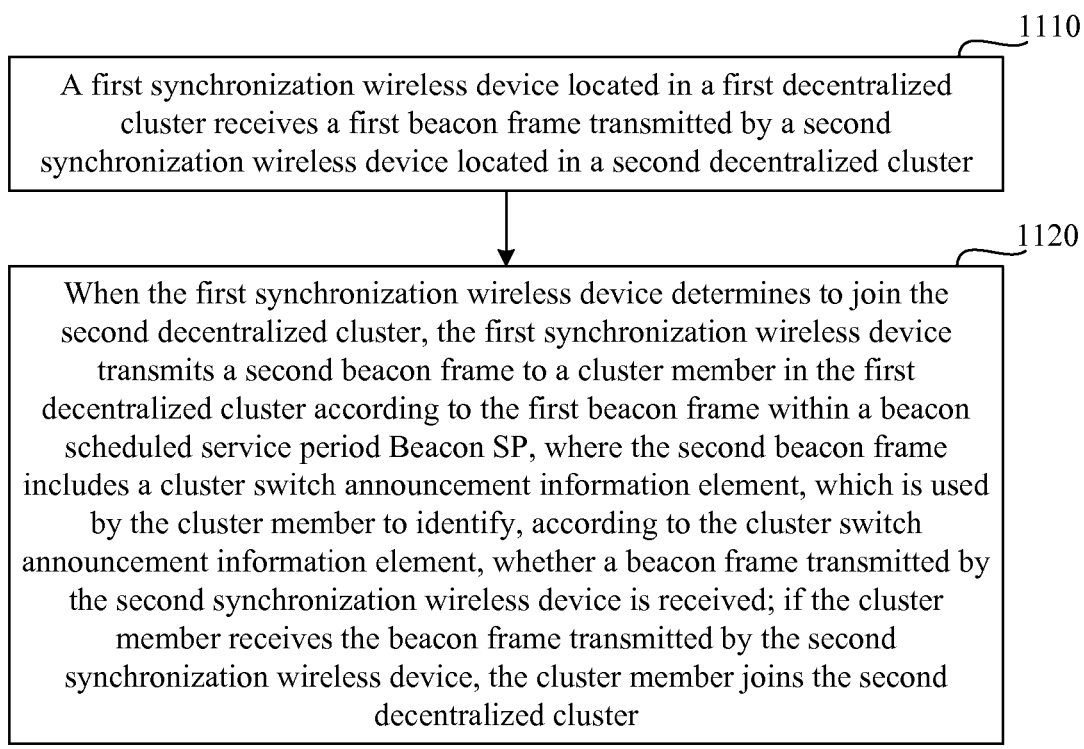

A first synchronization wireless device located in a first decentralized cluster receives a first beacon frame transmitted by a second synchronization wireless device located in a second decentralized cluster When the first synchronization wireless device determines to join the second decentralized cluster, the first synchronization wireless device transmits a second beacon frame to a cluster member in the first decentralized cluster according to the first beacon frame within a beacon scheduled service period Beacon SP, where the second beacon frame includes a cluster switch announcement information element, which is used by the cluster member to identify, according to the cluster switch announcement information element, whether a beacon frame transmitted by the second synchronization wireless device is received; if the cluster member receives the beacon frame transmitted by the second synchronization wireless device, the cluster member joins the second decentralized cluster

FIG. 11

| IE ID | Length | New Channel Number | Reference Timestamp | Reported Clustering Control |
|---|---|---|---|---|

FIG. 12

METHOD AND APPARATUS FOR IMPLEMENTING DECENTRALIZED CLUSTERING MECHANISM

CROSS-REFERENCE TO RELATED APPLICATIONS

This application is a continuation of International Patent Application No. PCT/CN2014/073232, filed on Mar. 11, 2014, which claims priority to Chinese Patent Application No. 201310076705.7, filed on Mar. 11, 2013, both of which are hereby incorporated by reference in their entireties.

TECHNICAL FIELD

The present invention relates to the field of communications technologies, and in particular, to a method and an apparatus for implementing a decentralized clustering mechanism.

BACKGROUND

In the communications field, 60 GHz wireless communication pertains to millimeter wave communication. Generally, a millimeter wave refers to an electromagnetic wave whose wavelength is between 1 millimeter and 10 millimeters, corresponds to a frequency range from 30 GHz to 300 GHz, and is widely used in many fields, such as communication, radar, navigation, remote sensing, and astronomy.

Currently, license-exempt 60 GHz frequency bands allocated for China are only 5 GHz from 59 GHz to 64 GHz. According to the IEEE 802.11ad communications protocol, channel division is performed on a license-exempt frequency band. As shown in FIG. 1, there is only one type of channel bandwidth 2.16 GHz in channel division used in IEEE 802.11 ad, including channels numbered 1 to 4. The channels numbered 1 to 4 are referred to as large bandwidth channels; Chinese Working Group for Wireless Personal Area Network further divides the two physical channels numbered 2 and 3 into two 1.08 GHz channels 5 and 6 and two 1.08 GHz channels 7 and 8 respectively, and the channels numbered 5 to 8 are referred to as small bandwidth channels. In FIG. 1, channels 5 and 6 and channel 2, and channels 7 and 8 and channel 3 are different, but their frequencies overlap and these channels are co-channel interference channels with each other. For example, for channel 2, in addition to interference from its own large bandwidth (2.16 GHz) channel, there is also interference brought by the two small bandwidth (1.08 GHz) channels 5 and 6 that overlap channel 2.

Because a large number of co-channel interference problems exist in a densely-deployed network environment, a PCP/AP clustering mechanism is generally used to curb the co-channel interference problems. The PCP/AP clustering mechanism allows each cluster member PCP/AP to perform scheduling, so as to transmit a frame in a non-overlapping time period. There are two types of PCP/AP clustering mechanisms in IEEE 802.11 ad: a decentralized PCP/AP clustering mechanism and a centralized PCP/AP clustering mechanism.

A decentralized cluster enables nearby PCP/APs that run on a same channel to form a decentralized cluster. A PCP/AP in the cluster can receive a directional multi-gigabit beacon (DMG Beacon) frame and an announcement (Announce) frame that are transmitted by another PCP/AP and include scheduling information, so as to schedule communication in a non-overlapping time period and reduce interference between adjacent networks. The cluster includes a synchronization PCP/AP (S-PCP/S-AP) providing cluster synchronization information and control information. All members in the cluster use a DMG Beacon frame of the S-PCP/S-AP as a reference; the cluster members PCP/APs transmit a DMG Beacon frame within time of a group of Beacon SPs, so as to keep synchronized with the S-PCP/S-AP.

In the prior art, decentralized clustering includes two cases: becoming an S-PCP/S-AP and becoming a cluster member.

(1) A process of becoming an S-PCP/S-AP is specifically as follows: A PCP/AP transmits a DMG Beacon frame once at least every four BIs, where the DMG Beacon frame needs to include a Clustering Control (Clustering Control) field, setting of which meets a setting requirement of the S-PCP/S-AP.

(2) A process of joining a cluster with an identity of a cluster member is specifically as follows: After receiving a DMG Beacon frame transmitted by an S-PCP/S-AP, a PCP/AP listens on a channel; if finding that at least one Beacon SP is empty, randomly selects an empty Beacon SP to transmit the DMG Beacon and sets a BI, a length of a Beacon SP, a Cluster ID, and the like to same values as those of the S-PCP/S-AP, and in this case, the PCP/AP completes joining the decentralized cluster; if finding no empty Beacon SP, the PCP/AP cannot join the decentralized cluster.

However, the solution in the prior art also has the following disadvantage: The solution in the prior art provides only a co-channel decentralized PCP/AP clustering mechanism with equal bandwidth, and cannot resolve a problem concerning decentralized cluster establishment of a PCP/AP running on a 1.08 GHz small bandwidth channel and a PCP/AP running on a 2.16 GHz large bandwidth channel.

SUMMARY

Embodiments of the present invention provide a method and apparatus for implementing a decentralized clustering mechanism, which are used to implement that a decentralized cluster is formed between multi-channel PCP/APs.

According to a first aspect, an embodiment of the present invention provides a method for implementing a decentralized clustering mechanism, where the method includes:

reserving, by a first wireless device located on a first channel, multiple first scheduled service periods from a first data transfer interval;

switching, by the first wireless device, the first wireless device to a second channel within the first scheduled service periods, and transmitting a probe frame over the second channel, where the probe frame includes a cluster probe information element, and the cluster probe information element includes timing information that is used for enabling a second wireless device located on the second channel to transmit a response frame in response to the probe frame;

reserving, by the first wireless device, multiple second scheduled service periods corresponding to the first scheduled service periods from a second data transfer interval according to the timing information included in the cluster probe information element;

when the response frame transmitted by the second wireless device is received within the second scheduled service periods, identifying, by the first wireless device by using an extended cluster report information element included in the response frame, whether an empty beacon scheduled service period Beacon SP exists; and if the empty Beacon SP exists, transmitting, by the first wireless device, a beacon frame within the empty Beacon SP, so that the first wireless device joins a decentralized cluster in which the second wireless device is located.

In a first possible implementation manner, the extended cluster report information element includes cluster synchronization information and control information of the decentralized cluster in which the second wireless device is located; and the identifying, by the first wireless device by using an extended cluster report information element included in the response frame, whether an empty beacon scheduled service period Beacon SP exists specifically includes:

identifying, within a Beacon SP by the first wireless device by using the cluster synchronization information and control information of the decentralized cluster in which the second wireless device is located, whether the empty Beacon SP exists.

With reference to the first aspect or the first possible implementation manner of the first aspect, in a second possible implementation manner, after the transmitting, by the first wireless device, a beacon frame within the empty Beacon SP, so that the first wireless device joins a decentralized cluster in which the second wireless device is located, the method further includes:

determining, by the first wireless device, a variable beacon interval according to the cluster synchronization information and control information of the decentralized cluster in which the second wireless device is located, where the variable beacon interval is used by the first wireless device to continue to transmit a beacon frame over the second channel according to the variable beacon interval; and switching, by the first wireless device, the first wireless device back to the first channel according to the variable beacon interval, and transmitting the beacon frame within a beacon transmission interval on the first channel.

In a third possible implementation manner, before the reserving, by a first wireless device located on a first channel, multiple first scheduled service periods from a first data transfer interval, the method further includes:

receiving, by the first wireless device, an announcement frame transmitted by a station located on the first channel, where the announcement frame includes a cluster report information element having a cluster channel number; and reserving, on the first channel by the first wireless device according to the cluster report information element having the cluster channel number, the multiple first scheduled service periods from the first data transfer interval, so as to identify whether the empty Beacon SP exists.

In a fourth possible implementation manner, the method further includes:

when the response frame transmitted by the second wireless device is not received within the second scheduled service periods, re-reserving, by the first wireless device, the multiple first scheduled service periods from the first data transfer interval, and making a random adjustment to locations of the re-reserved first scheduled service periods.

With reference to the first aspect or the first, the second, the third, or the fourth possible implementation manner of the first aspect, in a fifth possible implementation manner, the first channel is specifically a 1.08 GHz bandwidth channel, and the second channel is specifically a 2.16 GHz bandwidth channel.

According to a second aspect, an embodiment of the present invention provides a method for implementing a decentralized clustering mechanism, where the method includes:

receiving, by a first wireless device located on a first channel within a first scheduled service period in a first data transfer interval, a probe frame transmitted by a second wireless device that switches from a second channel to the first channel, where the probe frame includes a cluster probe information element, and the cluster probe information element includes timing information that is used for enabling the first wireless device to transmit a response frame in response to the probe frame;

when the first wireless device is already located in a decentralized cluster, reserving, by the first wireless device, multiple second scheduled service periods from a second data transfer interval according to the timing information included in the cluster probe information element; and transmitting, by the first wireless device, a response frame within the second scheduled service periods, where the response frame includes an extended cluster report information element, which is used by the second wireless device to identify, by using the extended cluster report information element, whether an empty beacon scheduled service period Beacon SP exists; when the empty Beacon SP exists, the second wireless device transmits a beacon frame within the empty Beacon SP, so that the second wireless device joins the decentralized cluster in which the first wireless device is located.

In a first possible implementation manner, after the receiving, by a first wireless device located on a first channel within a first scheduled service period in a first data transfer interval, a probe frame transmitted by a second wireless device that switches from a second channel to the first channel, the method further includes:

identifying, by the first wireless device, whether the first wireless device is already located in the decentralized cluster; and when the first wireless device is not located in the decentralized cluster, establishing, by the first wireless device, a decentralized cluster, and setting the first wireless device as a synchronization wireless device in the decentralized cluster.

In a second possible implementation manner, the first channel is specifically a 2.16 GHz bandwidth channel, and the second channel is specifically a 1.08 GHz bandwidth channel.

According to a third aspect, an embodiment of the present invention provides a method for implementing a decentralized clustering mechanism, where the method includes:

receiving, by a first synchronization wireless device located in a first decentralized cluster, a first beacon frame transmitted by a second synchronization wireless device located in a second decentralized cluster; and when the first synchronization wireless device determines to join the second decentralized cluster, transmitting, by the first synchronization wireless device, a second beacon frame to a cluster member in the first decentralized cluster according to the first beacon frame within a beacon scheduled service period Beacon SP, where the second beacon frame includes a cluster switch announcement information element, which is used by the cluster member to identify, according to the cluster switch announcement information element, whether a beacon frame transmitted by the second synchronization wireless device is received; if the cluster member receives the beacon frame transmitted by the second synchronization wireless device, the cluster member joins the second decentralized cluster.

In a first possible implementation manner, both the first synchronization wireless device and the second synchronization wireless device may be located on either a first channel or a second channel.

With reference to the third aspect or the first possible implementation manner of the third aspect, in a second possible implementation manner, the first channel is specifically a 1.08 GHz bandwidth channel, and the second channel is specifically a 2.16 GHz bandwidth channel.

According to a fourth aspect, an embodiment of the present invention provides an apparatus for implementing a decentralized clustering mechanism, where the apparatus is located on a first channel, and the apparatus includes:

a first reserving unit, configured to reserve multiple first scheduled service periods from a first data transfer interval;

a transmitting unit, configured to switch from the first channel to a second channel within the first scheduled service periods and transmit a probe frame over the second channel, where the probe frame includes a cluster probe information element, and the cluster probe information element includes timing information that is used for enabling a wireless device located on the second channel to transmit a response frame in response to the probe frame;

a second reserving unit, configured to reserve multiple second scheduled service periods corresponding to the first scheduled service periods from a second data transfer interval according to the timing information included in the cluster probe information element; and an identifying unit, configured to: when the response frame transmitted by the wireless device located on the second channel is received within the second scheduled service periods, identify, by using an extended cluster report information element included in the response frame, whether an empty beacon scheduled service period Beacon SP exists, where the transmitting unit is further configured to: if the empty Beacon SP exists, transmit a beacon frame within the empty Beacon SP, so that the apparatus joins a decentralized cluster in which the wireless device on the second channel is located.

In a first possible implementation manner, the extended cluster report information element received by the identifying unit includes cluster synchronization information and control information of the decentralized cluster in which the wireless device on the second channel is located; and the identifying unit is specifically configured to identify, within a Beacon SP by using the cluster synchronization information and control information of the decentralized cluster in which the wireless device on the second channel is located, whether the empty Beacon SP exists.

With reference to the fourth aspect or the first possible implementation manner of the fourth aspect, in a second possible implementation manner, the apparatus further includes:

a determining unit, configured to determine a variable beacon interval according to the cluster synchronization information and control information of the decentralized cluster in which the wireless device on the second channel is located, where the variable beacon interval is used by the transmitting unit to continue to transmit a beacon frame over the second channel according to the variable beacon interval, where the transmitting unit is further configured to switch back to the first channel according to the variable beacon interval and transmit the beacon frame within a beacon transmission interval on the first channel.

In a third possible implementation manner, the apparatus further includes:

a receiving unit, configured to receive an announcement frame transmitted by a station located on the first channel, where the announcement frame includes a cluster report information element having a cluster channel number, where the first reserving unit is specifically configured to reserve, on the first channel according to the cluster report information element having the cluster channel number, the multiple first scheduled service periods from the first data transfer interval, so as to identify whether the empty Beacon SP exists.

In a fourth possible implementation manner, the first reserving unit is further configured to:

when the response frame transmitted by the wireless device on the second channel is not received within the second scheduled service periods, re-reserve the multiple first scheduled service periods from the first data transfer interval and make a random adjustment to locations of the re-reserved first scheduled service periods.

With reference to the fourth aspect or the first, the second, the third, or the fourth possible implementation manner of the fourth aspect, in a fifth possible implementation manner, the first channel is specifically a 1.08 GHz bandwidth channel, and the second channel is specifically a 2.16 GHz bandwidth channel.

According to a fifth aspect, an embodiment of the present invention provides an apparatus for implementing a decentralized clustering mechanism, where the apparatus is located on a first channel, and the apparatus includes:

a receiving unit, configured to receive, within a first scheduled service period in a first data transfer interval, a probe frame transmitted by a first wireless device that switches from a second channel to the first channel, where the probe frame includes a cluster probe information element, and the cluster probe information element includes timing information that is used for enabling the apparatus to transmit a response frame in response to the probe frame;

a reserving unit, configured to: when the apparatus is already located in a decentralized cluster, reserve multiple second scheduled service periods from a second data transfer interval according to the timing information included in the cluster probe information element; and a transmitting unit, configured to transmit a response frame within the second scheduled service periods, where the response frame includes an extended cluster report information element, which is used by the first wireless device to identify, by using the extended cluster report information element, whether an empty beacon scheduled service period Beacon SP exists; when the empty Beacon SP exists, the first wireless device transmits a beacon frame within the empty Beacon SP, so as to join the decentralized cluster in which the apparatus is located.

In a first possible implementation manner, the apparatus further includes:

an identifying unit, configured to identify whether the apparatus is already located in the decentralized cluster; and a setting unit, configured to: when the apparatus is not located in the decentralized cluster, establish a decentralized cluster and set the apparatus as a synchronization wireless device in the decentralized cluster.

In a second possible implementation manner, the first channel is specifically a 2.16 GHz bandwidth channel, and the second channel is specifically a 1.08 GHz bandwidth channel.

According to a sixth aspect, an embodiment of the present invention provides an apparatus for implementing a decentralized clustering mechanism, where the apparatus is located in a first decentralized cluster, and the apparatus includes:

a receiving unit, configured to receive a first beacon frame transmitted by a first synchronization wireless device located in a second decentralized cluster; and a transmitting unit, configured to: when the apparatus determines to join the second decentralized cluster, transmit a second beacon frame to a cluster member in the first decentralized cluster according to the first beacon frame within a beacon scheduled service period Beacon SP, where the second beacon frame includes a cluster switch announcement information element, which is used by the cluster member in the decentralized cluster to identify, according to the cluster switch announcement information element, whether a beacon frame transmitted by the first synchronization wireless device is received; if the cluster member receives the beacon frame transmitted by the first synchronization wireless device, the cluster member joins the second decentralized cluster.

In a first possible implementation manner, both the apparatus and the first synchronization wireless device may be located on either a first channel or a second channel.

With reference to the sixth aspect or the first possible implementation manner of the sixth aspect, in a second possible implementation manner, the first channel is specifically a 1.08 GHz bandwidth channel, and the second channel is specifically a 2.16 GHz bandwidth channel.

Therefore, by using the method and the apparatus for implementing a decentralized clustering mechanism provided in the embodiments of the present invention, a first wireless device switches the first wireless device from a first channel to a second channel and transmits a probe frame to a second wireless device located on the second channel, where the probe frame includes a cluster probe IE; after receiving a response frame transmitted by the second wireless device, the first wireless device identifies, by using an extended cluster report IE included in the response frame, whether an empty beacon scheduled service period exists; when the empty beacon scheduled service period exists, the first wireless device transmits a beacon frame within the empty beacon scheduled service period, so as to join a decentralized cluster in which the second wireless device is located. Therefore, a problem in the prior art that multi-channel clustering cannot be implemented is resolved, and efficiency of a multi-channel clustering process of a decentralized cluster is increased.

BRIEF DESCRIPTION OF DRAWINGS

FIG. 4 is a schematic diagram of a cluster probe IE according to the embodiment of the present invention;

FIG. 5 is a diagram of a format of a 1.08/2.16 BSS Coexistence Information field according to the embodiment of the present invention;

FIG. 6 is a schematic diagram of a coexistence management frame according to the embodiment of the present invention;

FIG. 8 is a schematic diagram of a Cluster Report Control field according to the embodiment of the present invention;

FIG. 10 is a schematic diagram of an extended cluster report IE according to the embodiment of the present invention;

FIG. 11 is a flowchart of a method for implementing a decentralized clustering mechanism according to Embodiment 3 of the present invention;

FIG. 12 is a schematic diagram of a cluster switch announcement IE according to the embodiment of the present invention;

DESCRIPTION OF EMBODIMENTS

To make the objectives, technical solutions, and advantages of the present invention clearer, the following further describes the embodiments of the present invention in detail with reference to the accompanying drawings.

Figure 1:
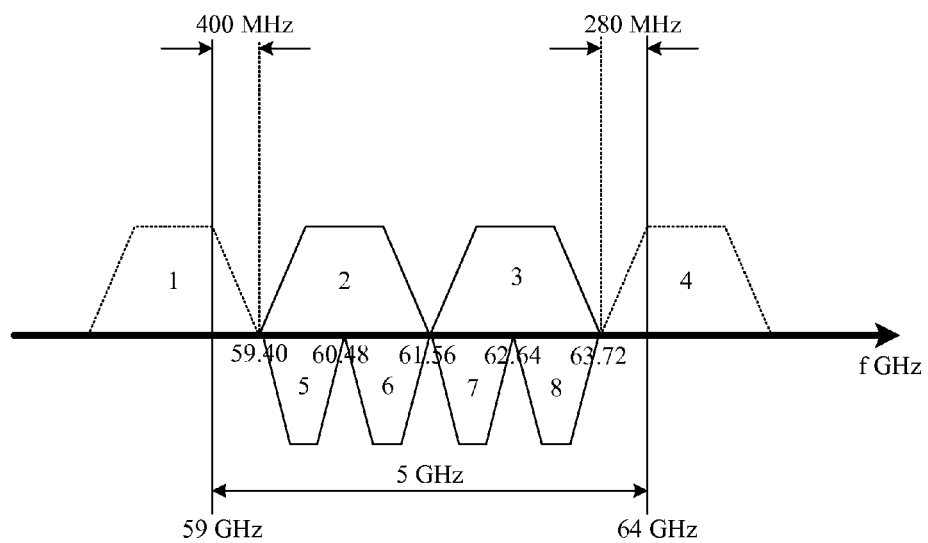
FIG. 1 is a schematic diagram of channel division of a license-exempt frequency band in the prior art.
Figure 2:
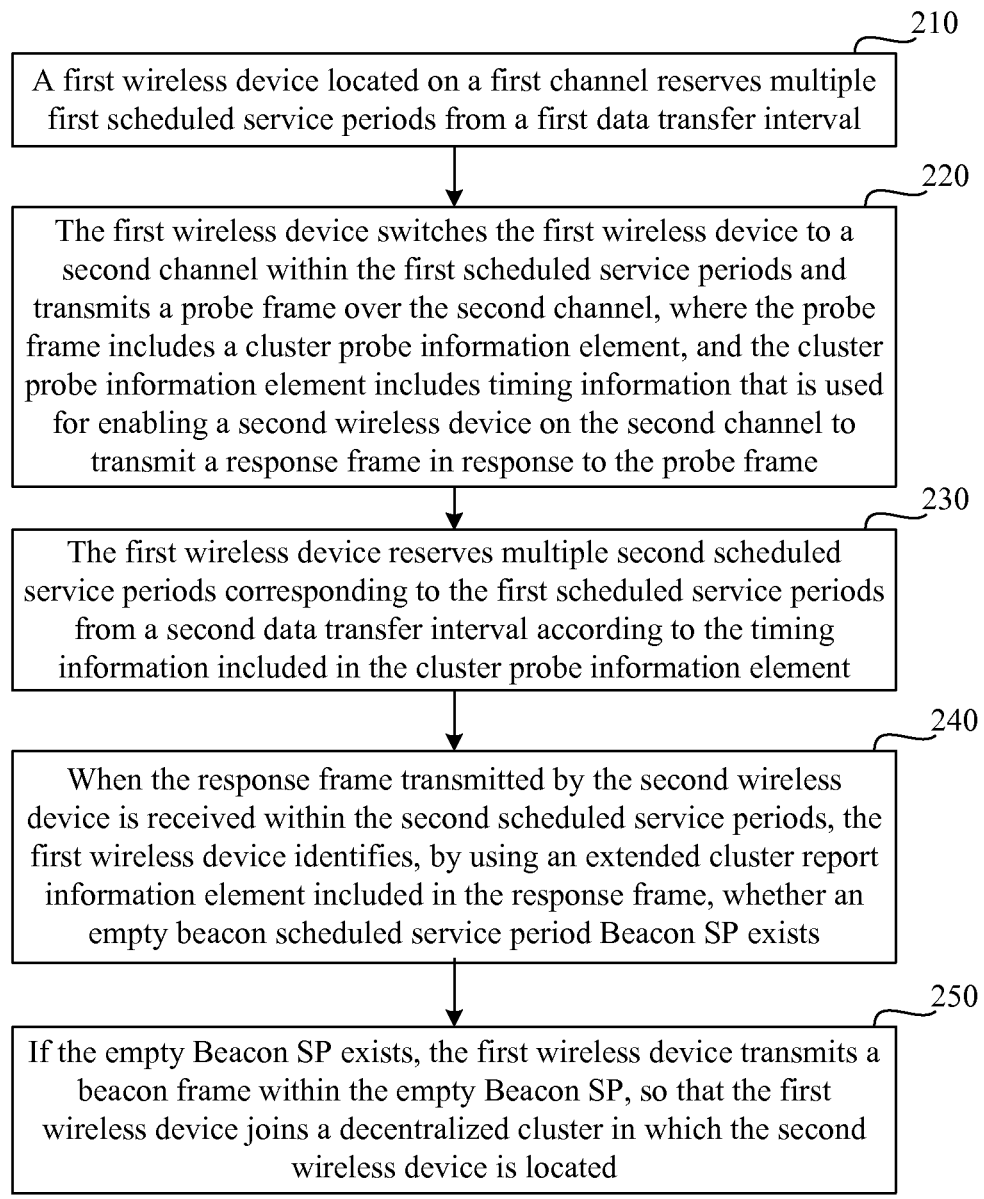
FIG. 2 is a flowchart of a method for implementing a decentralized clustering mechanism according to Embodiment 1 of the present invention.

FIG. 2 is used as an example in the following to illustrate a method for implementing a decentralized clustering mechanism provided in an embodiment of the present invention. FIG. 2 is a flowchart of a method for implementing a decentralized clustering mechanism according to Embodiment 1 of the present invention. This embodiment of the present invention is executed by a first wireless device located on a first channel, and the first wireless device in this embodiment of the present invention specifically includes a personal basic service set control point (PBSS Control Point, PCP for short) or a wireless access point (Access Point, AP for short). As shown in FIG. 2, this embodiment includes the following steps:

Step 210: The first wireless device located on the first channel reserves multiple first scheduled service periods from a first data transfer interval.

Specifically, the first wireless device located on the first channel reserves the multiple first scheduled service periods (Scheduled Service Period, SP for short) from the first data transfer interval (Data Transfer Interval, DTI for short) of the first wireless device, where the reserved scheduled service periods are used for transmitting related information in a subsequent step.

Figure 3:
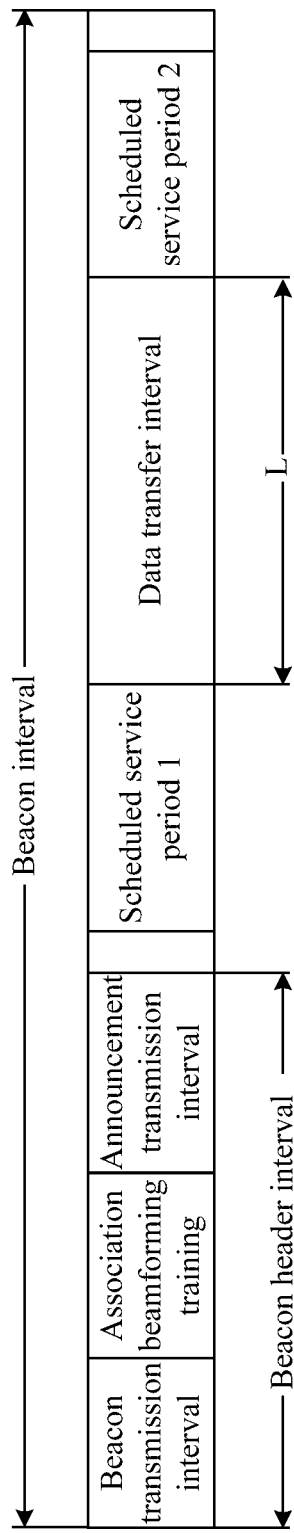
FIG. 3 is a schematic diagram of locations of reserved SPs according to the embodiment of the present invention.

Further, in an example, as shown in FIG. 3, FIG. 3 is a schematic diagram of locations of reserved SPs according to this embodiment of the present invention. In FIG. 3, the first wireless device reserves one SP separately from a front end and a back end of the first data transfer interval of the first wireless device, and a time interval L between the two SPs is enabled to be greater than a time length of a beacon header interval (Beacon Header Interval, BHI for short). FIG. 3 shows time division of a beacon interval BI in a basic service set (Basic Service Set, BSS for short). The time division is the prior art, and details are not described herein again.

It should be noted that if the time interval L between SP1 and SP2 is greater than the time length of the BHI, it is inevitable that one of probe frames transmitted in SP1 and SP2 by the first wireless device falls within a DTI of a second wireless device, so that there is a relatively high probability that the second wireless device can receive the probe frame from the first wireless device within the DTI of the second wireless device.

In this embodiment of the present invention, the first channel is specifically a 1.08 GHz bandwidth channel and may also be referred to as a small bandwidth channel.

Step 220: The first wireless device switches the first wireless device to a second channel within the first scheduled service periods and transmits a probe frame over the second channel, where the probe frame includes a cluster probe information element, and the cluster probe information element includes timing information that is used for enabling a second wireless device located on the second channel to transmit a response frame in response to the probe frame.

Specifically, after the first wireless device reserves the multiple first scheduled service periods in step 210, the first wireless device switches the first wireless device to the second channel within each scheduled service period and transmits the probe frame over the second channel, where the probe frame includes the cluster probe information element (Information Element, IE for short), and the cluster probe information element includes the timing information that is used for enabling the second wireless device located on the second channel to transmit the response frame in response to the probe frame.

Before the first wireless device transmits the probe frame, the first wireless device defines the cluster probe IE.

Specifically, a format of the cluster probe IE defined by the first wireless device is shown in FIG. 4. In FIG. 4, the cluster probe IE specifically includes one or a combination of some of the following attributes: IE ID (Element ID), Length (Length), 1.08/2.16 BSS Coexistence Information field (1.08/2.16 BSS Coexistence Information field), Request Token (Request Token), SP Offset (SP Offset), SP Space (SP Space), SP Duration (SP Duration), and Repetition Count (Repetition Count).

Further, a meaning of each attribute in the cluster probe IE is specifically as follows:

IE ID (Element ID): set to an ID of the cluster probe IE;

Length (Length): indicating the sum of lengths of all fields following Length;

1.08/2.16 BSS Coexistence Information field: including the following child attributes, which are, as shown in FIG. 5, Information Request (Information Request), 2.16 GHz Intolerant (2.16 GHz Intolerant), 1.08 GHz BSS Width Request (1.08 GHz BSS Width Request), and Reserved (Reserved);

Information Request (Information Request): when Information Request is set to 1, Information Request indicates that the first wireless device used as a transmit end is requesting the second wireless device used as a receive end to transmit a frame including cluster synchronization information and control information, where an address of the frame is an address of the first wireless device; when Information Request is set to 0, the attributes such as SP Offset, SP Space, SP Duration, and Repetition Count do not appear in the cluster probe IE;

2.16 GHz Intolerant (2.16 GHz Intolerant): when set to 1, preventing a BSS that is of the second wireless device and runs on a 2.16 GHz channel; when set to 0, not preventing a BSS that is of the second wireless device and runs on a 2.16 GHz channel, where the child attribute is used for inter-BSS communication;

1.08 GHz BSS Width Request (1.08 GHz BSS Width Request): when 1.08 GHz BSS Width Request is set to 1, preventing a BSS that is of the second wireless device and runs on a 2.16 GHz channel, and switching the BSS to a 1.08 GHz channel to run; otherwise, when 1.08 GHz BSS Width Request is set to 0, the child attribute is used for intra-BSS communication;

Request Token (Request Token): set to a non-zero value determined by a wireless access device used as a transmit end;

SP Offset (SP Offset): set to a time length between a frame including the cluster probe IE and a start of the first SP, where a time unit is TU;

SP Space (SP Space): set to an interval between starts of two SPs;

SP Duration (SP Duration): set to duration of a single SP; and

Repetition Count (Repetition Count): set to a quantity of requested SPs.

In this embodiment of the present invention, SP Offset, SP Space, SP Duration, and Repetition Count may also be the timing information that is used for enabling the second wireless device located on the second channel to transmit the response frame in response to the probe frame. That is, after receiving the cluster probe information element included in the probe frame, the second wireless device sets, according to SP Offset, SP Space, SP Duration, and Repetition Count that are included in the cluster probe information element, a time for transmitting the response frame.

In this embodiment of the present invention, as an example instead of a limitation, in an implementation manner, the probe frame carrying the cluster probe IE may be specifically any one of a probe request (Probe Request) frame, a directional multi-gigabit beacon (DMG Beacon) frame, and an association request (Association Request) frame.

In another implementation manner, a coexistence management frame may further be determined, and the cluster probe IE is carried in a 1.08/2.16 BSS coexistence management frame. As shown in FIG. 6, FIG. 6 is a schematic diagram of a coexistence management frame according to this embodiment of the present invention. A specific format of the 1.08/2.16 BSS coexistence management frame is as follows: a Category (Category) field is set to Public (Public); a Public Action (Public Action) field is set to cluster probing; and frame load is a cluster probe IE.

In this embodiment of the present invention, the second channel is specifically a 2.16 GHz bandwidth channel and may also be referred to as a large bandwidth channel.

Step 230: The first wireless device reserves multiple second scheduled service periods corresponding to the first scheduled service periods from a second data transfer interval according to the timing information included in the cluster probe information element.

Specifically, after transmitting the probe frame, the first wireless device reserves the multiple second scheduled service periods corresponding to the first scheduled service periods from the second data transfer interval according to the timing information, that is, SP Offset, SP Space, SP Duration, and Repetition Count included in the cluster probe IE.

According to the example in the foregoing step 210, as shown in FIG. 3, the first wireless device reserves two scheduled service periods from the first data transfer interval. In this step, the first wireless device also reserves two scheduled service periods from the second data transfer interval, where the reserved scheduled service periods are equal to as the rSMX: okSMX: okeserved scheduled service periods in step 210 and are used for waiting to receive related information transmitted by the second wireless device. In addition, after a time indicated by SP Offset starts, the first wireless device listens on the second channel within each reserved scheduled service period.

Step 240: When the response frame transmitted by the second wireless device is received within the second scheduled service periods, the first wireless device identifies, by using an extended cluster report information element included in the response frame, whether an empty beacon scheduled service period Beacon SP exists.

Specifically, after reserving the second scheduled service periods corresponding to the first scheduled service periods from the second data transfer interval, the first wireless device listens on the second channel within each reserved scheduled service period. When the response frame transmitted by the second wireless device located on the second channel is received within the second scheduled service periods, the first wireless device identifies, by using the extended cluster report IE included in the response frame, whether the empty beacon scheduled service period (Beacon Scheduled Service Period, Beacon SP for short) exists. If the empty beacon scheduled service period exists, step 250 is performed.

Further, in this embodiment of the present invention, the extended cluster report IE includes cluster synchronization information and control information of a decentralized cluster in which the second wireless device is located.

That the first wireless device identifies, by using the extended cluster report IE included in the response frame, whether the empty beacon scheduled service period exists specifically includes the following: By using the cluster synchronization information and control information of the decentralized cluster in which the second wireless device is located, the first wireless device monitors the second channel within a beacon scheduled service period and identifies whether the empty beacon scheduled service period exists.

Further, after receiving the response frame, the first wireless device parses the response frame and extracts the cluster report IE included in the response frame, and parses the cluster report IE, so that the cluster synchronization information and control information of the decentralized cluster in which the second wireless device is located are extracted from the cluster report IE, and a group of beacon scheduled service periods is determined. The first wireless device identifies, within the group of beacon scheduled service periods according to the cluster synchronization information and control information, whether the empty beacon scheduled service period exists.

Step 250: If the empty Beacon SP exists, the first wireless device transmits a beacon frame within the empty Beacon SP, so that the first wireless device joins a decentralized cluster in which the second wireless device is located.

Specifically, according to the identification in step 240, if the empty beacon scheduled service period exists, the first wireless device transmits the beacon frame within the empty Beacon SP, so that the first wireless device joins the decentralized cluster in which the second wireless device is located.

If the empty Beacon SP does not exist, the first wireless device does not transmit the beacon frame, and this indicates that the first wireless device cannot join the decentralized cluster in which the second wireless device is located.

Therefore, by performing the method for implementing a decentralized clustering mechanism provided in this embodiment of the present invention, a first wireless device switches the first wireless device from a first channel to a second channel and transmits a probe frame to a second wireless device located on the second channel, where the probe frame includes a cluster probe IE; after receiving a response frame transmitted by the second wireless device, the first wireless device identifies, by using an extended cluster report IE included in the response frame, whether an empty Beacon SP exists; when the empty Beacon SP exists, the first wireless device transmits a beacon frame within the empty Beacon SP, so as to join a decentralized cluster in which the second wireless device is located. Therefore, a problem in the prior art that multi-channel clustering cannot be implemented is resolved, and efficiency of a multi-channel clustering process of a decentralized cluster is increased.

Optionally, after step 250 in this embodiment of the present invention, the method further includes steps of determining a variable beacon interval (Variable Beacon Interval, VBI for short) and switching back to the first channel. The variable beacon interval VBI is determined, so that the first wireless device schedules communication with another wireless device (for example, the second wireless device, a synchronization wireless device) in the cluster in a non-overlapping time period when transmitting the beacon frame over the second channel, so as to reduce interference. After joining the decentralized cluster in which the second wireless device is located, the first wireless device may further switch back to the first channel and continue to transmit a beacon frame (the beacon frame is the same as the beacon frame transmitted over the second channel) over the first channel, so that a wireless device on the first channel schedules communication in a non-overlapping time period when receiving the beacon frame, so as to reduce interference.

The first wireless device determines the variable beacon interval according to the cluster synchronization information and control information of the decentralized cluster in which the second wireless device is located, where the variable beacon interval is used by the first wireless device to continue to transmit a beacon frame over the second channel according to the variable beacon interval.

Specifically, the first wireless device determines the variable beacon interval according to the cluster synchronization information and control information, where the variable beacon interval is used by the first wireless device to continue to transmit the beacon frame within a Beacon SP on the second channel according to the variable beacon interval.

Figure 7:
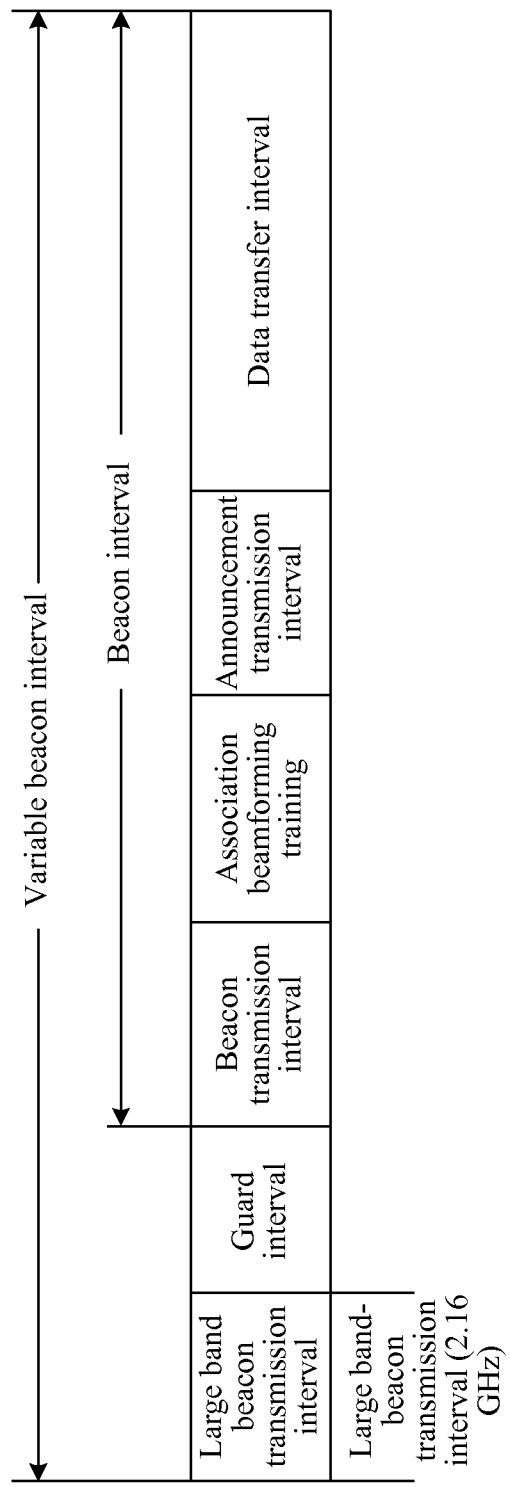
FIG. 7 is a schematic diagram of a variable beacon interval according to the embodiment of the present invention.

Further, the variable beacon interval determined by the first wireless device is shown in FIG. 7. In FIG. 7, the first wireless device adds a large band beacon transmission interval (Large Band Beacon Transmission Interval, LB-BTI for short) and a guard interval (Guaranteed Interval, GI for short) (in channel switching) to the original beacon interval BI, where the LB-BTI is an access period used by the first wireless device to transmit a beacon frame over the second channel (a large bandwidth channel), and a start of the LB-BTI is aligned with that of the Beacon SP.

The first wireless device switches the first wireless device back to the first channel according to the variable beacon interval and transmits the beacon frame within a beacon transmission interval on the first channel.

Specifically, the first wireless device switches the first wireless device to the first channel within the guard interval according to the guard interval GI of the variable beacon interval, and transmits the beacon frame within the beacon transmission interval BTI on the first channel.

Optionally, in step 240 in this embodiment of the present invention, there is another case, that is, when the response frame transmitted by the second wireless device is not received within the second scheduled service periods, the first wireless device re-reserves the multiple first scheduled service periods from the first data transfer interval and makes a random adjustment to locations of the re-reserved first scheduled service periods.

Specifically, when the response frame transmitted by the second wireless device is not received by the first wireless device within the second scheduled service periods, the first wireless device returns to step 210, that is, re-reserves the multiple first scheduled service periods from the first data transfer interval and makes a random adjustment to the locations of the re-reserved first scheduled service periods, for example, moves the locations of the reserved first scheduled service periods.

In the embodiments of the present invention, a cluster formation mechanism in the decentralized clustering mechanism is described in the foregoing embodiment and the optional steps, and the decentralized clustering mechanism further includes a cluster information report mechanism. A wireless device may form a decentralized cluster on multiple channels by using a cluster information report, or schedule communication in a non-overlapping time period according to the cluster information report, so as to reduce interference.

Optionally, before step 210 in this embodiment of the present invention, the method further includes a step in which the first wireless device receives an announcement frame. According to the received announcement frame, the first wireless device joins the decentralized cluster on the second channel.

The first wireless device receives the announcement frame transmitted by a station located on the first channel, where the announcement frame includes a cluster report information element having a cluster channel number.

Specifically, the first wireless device receives the announcement frame transmitted by the station on the first channel, where the announcement frame includes the cluster report IE having the cluster channel number.

Further, the station (Station, STA for short) on the first channel reserves multiple SPs from a data transfer interval DTI of the station, switches to the second channel within the SPs, and listens on the second channel. If receiving the beacon frame of the decentralized cluster on the second channel, the station transmits the announcement frame to the first wireless device, where the announcement frame includes the cluster report IE having the cluster channel number.

It may be understood that the station on the first channel transmits the announcement frame to the first wireless device to which the station is associated.

The first wireless device reserves, on the first channel according to the cluster report information element having the cluster channel number, the multiple first scheduled service periods from the first data transfer interval, so as to identify whether the empty Beacon SP exists.

Specifically, after receiving the announcement frame, the first wireless device parses the announcement frame and extracts content of the announcement frame, extracts the cluster report IE from the announcement frame, extracts a Cluster Report Control field (Cluster Report Control field) from the cluster report IE, and acquires the cluster channel number from the Cluster Report Control field. As shown in FIG. 8, FIG. 8 is a schematic diagram of a Cluster Report Control field according to this embodiment of the present invention. In this embodiment of the present invention, the cluster channel number is added to a Cluster Report Control field in the prior art, and a channel on which the station receives a beacon frame is determined by using this field. As an example instead of a limitation, when the cluster channel number is set to 1, it indicates that the beacon frame received by the station is transmitted by a decentralized cluster located on the first channel; when the cluster channel number is set to 0, it indicates that the beacon frame received by the station is transmitted by the decentralized cluster located on the second channel.

In this embodiment of the present invention, when the cluster channel number is 0, the beacon frame received by the station is transmitted by the decentralized cluster on the second channel.

When determining that the cluster channel number is 0, the first wireless device starts to perform clustering on the second channel, and reserves the multiple first scheduled service periods from the first data transfer interval on the first channel, that is, performs step 210 to step 250.

To make the objectives, technical solutions, and advantages of the present invention clearer, the following further describes the embodiments of the present invention in detail with reference to the accompanying drawings.

Figure 9:
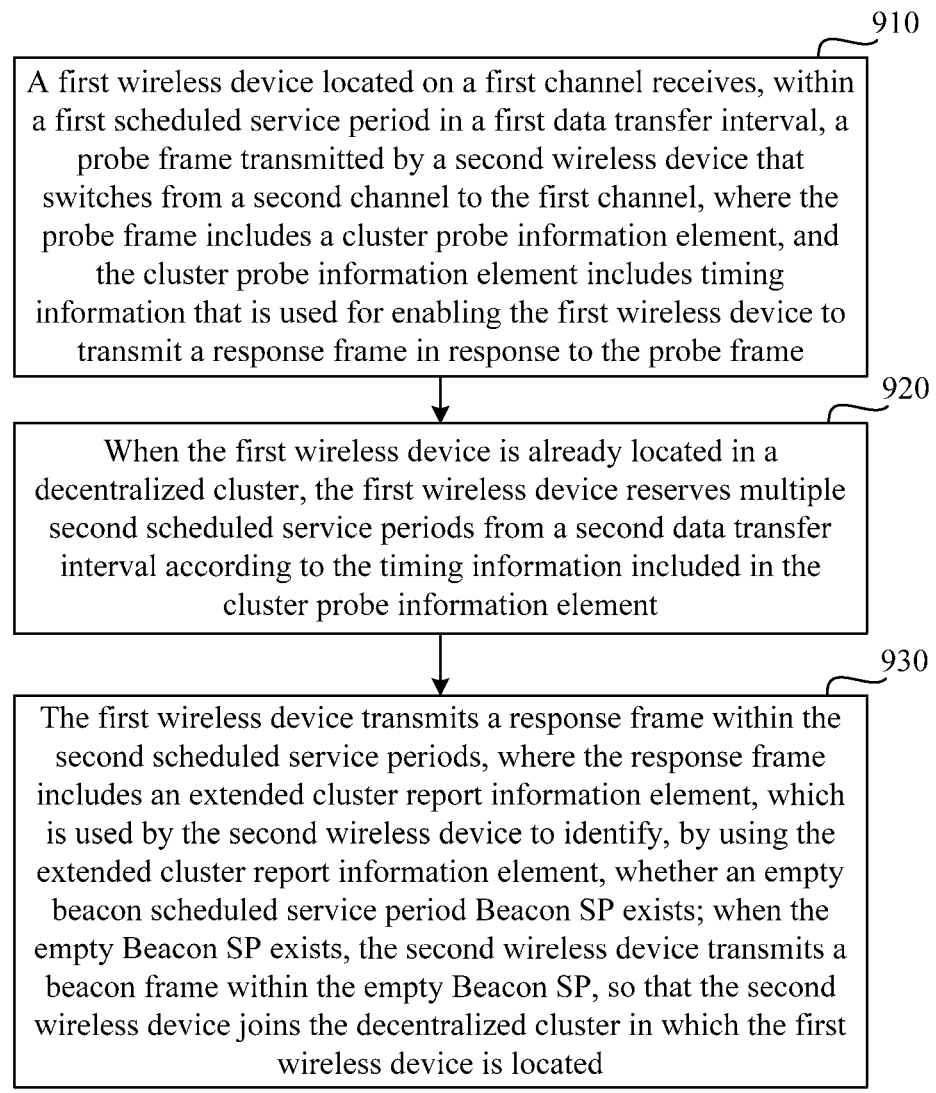
FIG. 9 is a flowchart of a method for implementing a decentralized clustering mechanism according to Embodiment 2 of the present invention.

FIG. 9 is used as an example in the following to illustrate a method for implementing a decentralized clustering mechanism provided in an embodiment of the present invention. FIG. 9 is a flowchart of a method for implementing a decentralized clustering mechanism according to Embodiment 2 of the present invention. This embodiment of the present invention is executed by a first wireless device located on a first channel, and the first wireless device in this embodiment of the present invention specifically includes a personal basic service set control point PCP or a wireless access point AP. As shown in FIG. 9, this embodiment includes the following steps:

Step 910: The first wireless device located on the first channel receives, within a first scheduled service period in a first data transfer interval, a probe frame transmitted by a second wireless device that switches from a second channel to the first channel, where the probe frame includes a cluster probe information element, and the cluster probe information element includes timing information that is used for enabling the first wireless device to transmit a response frame in response to the probe frame.

Specifically, the first wireless device receives the probe frame transmitted by the second wireless device, where the probe frame includes the cluster probe IE, and the cluster probe IE includes the timing information that is used for enabling the first wireless device to transmit the response frame in response to the probe frame. A format of the cluster probe IE and a function of each attributes have been described clearly in the foregoing embodiment, and details are not described herein again.

Further, in this embodiment of the present invention, the first wireless device may receive the probe frame in multiple manners. As an example instead of a limitation, in an implementation manner, the first wireless device itself receives the probe frame transmitted by the second wireless device; or in another implementation manner, a station in a decentralized cluster in which the first wireless device is located reports, to the first wireless device, the probe frame transmitted by the second wireless device.

In this embodiment of the present invention, the first channel is specifically a 2.16 GHz bandwidth channel, and the second channel is specifically a 1.08 GHz bandwidth channel.

Step 920: When the first wireless device is already located in a decentralized cluster, the first wireless device reserves multiple second scheduled service periods from a second data transfer interval according to the timing information included in the cluster probe information element.

Specifically, when the first wireless device is already located in the decentralized cluster on the first channel, that is, has already formed a cluster, the first wireless device reserves the multiple second scheduled service periods from the second data transfer interval according to the timing information, that is, SP Offset, SP Space, SP Duration, and Repetition Count, included in the cluster probe IE.

Step 930: The first wireless device transmits a response frame within the second scheduled service periods, where the response frame includes an extended cluster report information element, which is used by the second wireless device to identify, by using the extended cluster report information element, whether an empty beacon scheduled service period Beacon SP exists; when the empty Beacon SP exists, the second wireless device transmits a beacon frame within the empty Beacon SP, so that the second wireless device joins the decentralized cluster in which the first wireless device is located.

Specifically, the first wireless device transmits the response frame within the second scheduled service periods, where the response frame includes the extended cluster report IE, which is used by the second wireless device to identify, by using the extended cluster report IE, whether the empty Beacon SP exists; when the empty Beacon SP exists, the second wireless device transmits the beacon frame within the empty Beacon SP, so that the second wireless device joins the decentralized cluster in which the first wireless device is located.

Before the first wireless device transmits the response frame, the first wireless device determines the extended cluster report IE.

Specifically, a format of the extended cluster report IE determined by the first wireless device is shown in FIG. 10. In FIG. 10, the extended cluster report IE specifically includes one or a combination of some of the following attributes: IE ID (Element ID), Length (Length), Request Token (Request Token), Next BTI Offset (Next BTI Offset), and Reported Clustering Control (Reported Clustering Control).

Further, a meaning of each attribute in the extended cluster report IE is specifically as follows:

IE ID (Element ID): set to an ID of the extended cluster report IE;

Length (Length): indicating the sum of lengths of all attributes following Length;

Request Token (Request Token): set to being the same as a corresponding request token in the cluster probe IE;

Next BTI Offset (Next BTI Offset): set to offset time of a starting time of a next beacon transmission interval relative to a PPDU including the extended cluster report IE, where a unit of the offset time is TU; and Reported Clustering Control (Reported Clustering Control): set to a Clustering Control field in a beacon frame in a cluster in which the first wireless device is located.

In this embodiment of the present invention, the extended cluster report IE may be carried to a directional multi-gigabit beacon (DMG Beacon) frame, a probe response (Probe Response) frame, an announcement frame, or the like for transmission. If the first wireless device uses the beacon frame as a carrier frame for the extended cluster report IE, the Clustering Control field cannot be included in the beacon frame, and the Clustering Control field needs to be included in the extended cluster report IE. A reason is that another cluster member wireless device may consider that the beacon frame that is transmitted by the first wireless device and includes the Clustering Control field is clustering control information, which causes that the another cluster member wireless device misunderstands the beacon frame.

It should be noted that the first wireless device in this embodiment of the present invention may be specifically a cluster member in the decentralized cluster on the first channel, or may be a synchronization wireless device in the decentralized cluster.

Therefore, by using the method for implementing a decentralized clustering mechanism provided in this embodiment of the present invention, a first wireless device receives a probe frame transmitted by a second wireless device that has already switched to a first channel, and determines a response frame according to a cluster probe IE included in the probe frame, and transmits the response frame to the second wireless device, so that the second wireless device identifies, by using an extended cluster report IE included in the response frame, whether an empty Beacon SP exists; when the empty Beacon SP exists, the second wireless device transmits a beacon frame within the empty Beacon SP, so that the second wireless device joins a decentralized cluster in which the first wireless device is located. Therefore, a problem in the prior art that multi-channel clustering cannot be implemented is resolved, and efficiency of a multi-channel clustering process of a decentralized cluster is increased.

Optionally, after step 910 in this embodiment of the present invention, the method further includes a step in which the first wireless device identifies whether the first wireless device is already located in the decentralized cluster. By means of identification of whether the first wireless device is already located in the decentralized cluster, that the second wireless device joins the decentralized cluster on the first channel can be simplified.

The first wireless device identifies whether the first wireless device is already located in the decentralized cluster.

Specifically, after receiving the probe frame, the first wireless device identifies whether the first wireless device is already located in the decentralized cluster. If the first wireless device is already located in the decentralized cluster, step 920 is performed; otherwise, the following step is performed.

When the first wireless device is not located in the decentralized cluster, the first wireless device establishes a decentralized cluster and sets the first wireless device as a synchronization wireless device in the decentralized cluster.

Specifically, when the first wireless device is not located in the decentralized cluster, it indicates that the first wireless device serves as neither a synchronization wireless device nor a cluster member wireless device on the first channel and cannot transmit a response frame to the second wireless device; the first wireless device establishes the decentralized cluster and sets the first wireless device as the synchronization wireless device in the decentralized cluster.

The first wireless device that becomes the synchronization wireless device can provide cluster synchronization information and control information in the cluster and requires a cluster member to keep synchronized by using the cluster synchronization information and control information of the first wireless device as a reference.

That the first wireless device establishes the decentralized cluster pertains to the prior art, and details are not described herein again.

To make the objectives, technical solutions, and advantages of the present invention clearer, the following further describes the embodiments of the present invention in detail with reference to the accompanying drawings.

In the embodiments of the present invention, the cluster formation mechanism and the cluster information report mechanism in the decentralized cluster mechanism are described in the foregoing embodiments and optional steps, and the decentralized cluster mechanism further includes a cluster maintenance mechanism. By using the cluster maintenance mechanism, a wireless device performs maintenance and management on a formed decentralized cluster after a synchronization wireless device in the cluster is lost.

FIG. 11 is used as an example in the following to illustrate a method for implementing a decentralized clustering mechanism provided in an embodiment of the present invention. FIG. 11 is a flowchart of a method for implementing a decentralized clustering mechanism according to Embodiment 3 of the present invention. This embodiment of the present invention is executed by a synchronization wireless device on a first/second channel, and the synchronization wireless device in this embodiment of the present invention specifically includes a personal basic service set control point PCP or a wireless access point AP. As shown in FIG. 11, this embodiment includes the following steps:

Step 1110: A first synchronization wireless device located in a first decentralized cluster receives a first beacon frame transmitted by a second synchronization wireless device located in a second decentralized cluster.

Specifically, the first synchronization wireless device in the first decentralized cluster receives the first beacon frame transmitted by the second synchronization wireless device in the second decentralized cluster.

Further, the first synchronization wireless device may receive the first beacon frame in multiple manners. As an example instead of a limitation, in an implementation manner, the first synchronization wireless device itself receives the first beacon frame transmitted by the second synchronization wireless device; or in another implementation manner, a cluster member or a station in the first decentralized cluster reports, to the first synchronization wireless device, the first beacon frame transmitted by the second synchronization wireless device.

Step 1120: When the first synchronization wireless device determines to join the second decentralized cluster, the first synchronization wireless device transmits a second beacon frame to a cluster member in the first decentralized cluster according to the first beacon frame within a beacon scheduled service period Beacon SP, where the second beacon frame includes a cluster switch announcement information element, which is used by the cluster member to identify, according to the cluster switch announcement information element, whether a beacon frame transmitted by the second synchronization wireless device is received; if the cluster member receives the beacon frame transmitted by the second synchronization wireless device, the cluster member joins the second decentralized cluster.

Specifically, when the first synchronization wireless device determines to join the second decentralized cluster, the first synchronization wireless device transmits the second beacon frame to the cluster member in the first decentralized cluster according to the first beacon frame within the beacon scheduled service period, where the second beacon frame includes the cluster switch announcement IE, which is used by the cluster member to identify, according to the cluster switch announcement IE, whether the beacon frame transmitted by the second synchronization wireless device is received; if the cluster member receives the beacon frame transmitted by the second synchronization wireless device, the cluster member joins the second decentralized cluster.

It should be noted that when the cluster member is identifying whether the beacon frame transmitted by the second synchronization wireless device is received, the beacon frame may be the first beacon frame, or may be a third beacon frame transmitted by the second synchronization wireless device after transmitting the first beacon frame.

Before the first synchronization wireless device transmits the second beacon frame, the first synchronization wireless device determines the cluster switch announcement IE.

Specifically, a format of the cluster switch announcement IE determined by the first synchronization wireless device is shown in FIG. 12. In FIG. 12, the cluster switch announcement IE specifically includes one or a combination of some of the following attributes: IE ID (Element ID), Length (Length), New Channel Number (New Channel Number), Reference Timestamp (Reference Timestamp), and Reported Clustering Control (Reported Clustering Control).

Further, a meaning of each attribute in the cluster switch announcement IE is specifically as follows:

IE ID (Element ID): set to an ID of the cluster switch announcement IE;

Length (Length): indicating the sum of lengths of all attributes following Length;

New Channel Number (New Channel Number): set to a target channel on which the cluster is located after cluster switching, that is, a channel on which the second decentralized cluster runs;

Reference Timestamp (Reference Timestamp): set to lower 4 octets of a TSF timer value collected at a moment when Media Access Control MAC receives a beacon frame of a target cluster; and Reported Clustering Control (Reported Clustering Control): set to a Clustering Control field included in a beacon frame transmitted by the second synchronization wireless device.

In this embodiment of the present invention, the first synchronization wireless device adds the cluster switch announcement IE to a beacon frame for transmission, and the beacon frame can be received by a cluster member in the cluster.

After receiving the beacon frame, the cluster member in the first decentralized cluster parses the beacon frame and extracts the cluster switch announcement IE in the beacon frame, and when keeping transmitting a beacon frame on the original channel, attempts to receive, according to Reference Timestamp, New Channel Number and Reported Clustering Control in the cluster switch announcement IE, a beacon frame transmitted by the second synchronization wireless device on the target channel. If receiving the beacon frame transmitted by the second synchronization wireless device, the cluster member starts to join the second decentralized cluster; otherwise, the cluster member completes cluster maintenance according to an original cluster maintenance protocol in IEEE 802.11 ad.

Therefore, by using the method for implementing a decentralized clustering mechanism provided in this embodiment of the present invention, when a first synchronization wireless device determines to join a second decentralized cluster, the first synchronization wireless device transmits a second beacon frame to a cluster member in a first decentralized cluster according to a first beacon frame within a beacon scheduled service period, where the second beacon frame includes a cluster switch announcement IE, which is used by the cluster member to identify, according to the cluster switch announcement IE, whether the first beacon frame is received; if the cluster member receives the first beacon frame, the cluster member joins the second decentralized cluster, so as to perform maintenance and management on the formed decentralized cluster after a synchronization wireless device in the cluster is lost.

Optionally, after step 1110 in this embodiment of the present invention, the method further includes a step in which the first synchronization wireless device determines whether to join the second decentralized cluster. By means of determining of whether the first synchronization wireless device joins the second decentralized cluster, maintenance and management can be performed on the formed decentralized cluster.

The first synchronization wireless device determines whether its own Media Access Control MAC address is greater than a MAC address of the second synchronization wireless device.

Specifically, after the first synchronization wireless device receives the first beacon frame, the first synchronization wireless device determines whether its own MAC address is greater than the MAC address of the second synchronization wireless device. If the MAC address of the first synchronization wireless device is greater than the MAC address of the second synchronization wireless device, the first synchronization wireless device determines to join the second decentralized cluster and performs the step described below.

If the MAC address of the first synchronization wireless device is greater than the MAC address of the second synchronization wireless device, the first synchronization wireless device determines to join the second decentralized cluster.

Specifically, if the MAC address of the first synchronization wireless device is greater than the MAC address of the second synchronization wireless device, the first synchronization wireless device determines to join the second decentralized cluster and performs the subsequent content of step 1120; otherwise, the first synchronization wireless device does not join the second decentralized cluster.

In this embodiment of the present invention, both the first synchronization wireless device and the second synchronization wireless device may be located on either the first channel or the second channel. The first channel is specifically a 1.08 GHz bandwidth channel, and the second channel is specifically a 2.16 GHz bandwidth channel.

Figure 13:
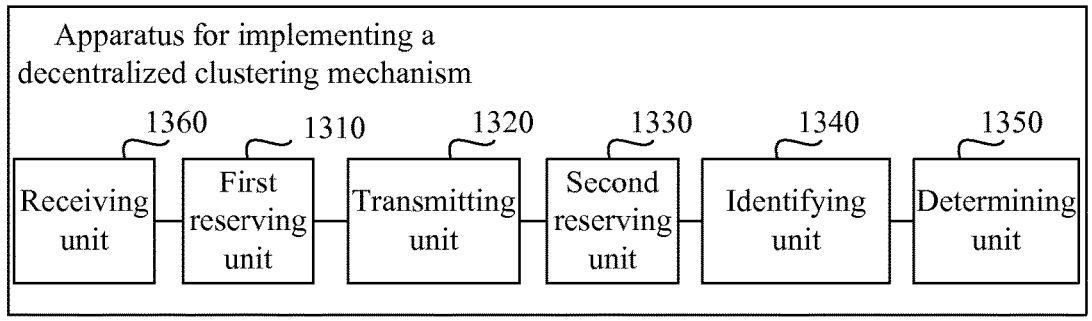
FIG. 13 is a structural block diagram of an apparatus for implementing a decentralized clustering mechanism according to Embodiment 4 of the present invention.

Correspondingly, Embodiment 4 of the present invention provides an apparatus for implementing a decentralized clustering mechanism, which is configured to implement the method for implementing a decentralized clustering mechanism in Embodiment 1. As shown in FIG. 13, the apparatus is located on a first channel, and the apparatus includes: a first reserving unit 1310, a transmitting unit 1320, a second reserving unit 1330, and an identifying unit 1340.

The first reserving unit 1310 is configured to reserve multiple first scheduled service periods from a first data transfer interval.

The transmitting unit 1320 is configured to switch from the first channel to a second channel within the first scheduled service periods and transmit a probe frame over the second channel, where the probe frame includes a cluster probe information element, and the cluster probe information element includes timing information that is used for enabling a wireless device located on the second channel to transmit a response frame in response to the probe frame.

The second reserving unit 1330 is configured to reserve multiple second scheduled service periods corresponding to the first scheduled service periods from a second data transfer interval according to the timing information included in the cluster probe information element.

The identifying unit 1340 is configured to: when the response frame transmitted by the wireless device located on the second channel is received within the second scheduled service periods, identify, by using an extended cluster report information element included in the response frame, whether an empty beacon scheduled service period Beacon SP exists.

The transmitting unit 1320 is further configured to: if the empty Beacon SP exists, transmit a beacon frame within the empty Beacon SP, so that the apparatus joins a decentralized cluster in which the wireless device on the second channel is located.

The extended cluster report information element received by the identifying unit 1340 includes cluster synchronization information and control information of the decentralized cluster in which the wireless device on the second channel is located.

The identifying unit 1340 is specifically configured to identify, within a Beacon SP by using the cluster synchronization information and control information of the decentralized cluster in which the wireless device on the second channel is located, whether the empty Beacon SP exists.

The apparatus further includes: a determining unit 1350, configured to determine a variable beacon interval according to the cluster synchronization information and control information of the decentralized cluster in which the wireless device on the second channel is located, where the variable beacon interval is used by the transmitting unit to continue to transmit a beacon frame over the second channel according to the variable beacon interval.

The transmitting unit 1320 is further configured to switch back to the first channel according to the variable beacon interval and transmit the beacon frame within a beacon transmission interval on the first channel.

The apparatus further includes: a receiving unit 1360, configured to receive an announcement frame transmitted by a station located on the first channel, where the announcement frame includes a cluster report information element having a cluster channel number.

The first reserving unit 1310 is specifically configured to reserve, on the first channel according to the cluster report information element having the cluster channel number, the multiple first scheduled service periods from the first data transfer interval, so as to identify whether the empty Beacon SP exists.

The first reserving unit 1310 is further configured to: when the response frame transmitted by the wireless device on the second channel is not received within the second scheduled service periods, re-reserve the multiple first scheduled service periods from the first data transfer interval and make a random adjustment to locations of the re-reserved first scheduled service periods.

The first channel is specifically a 1.08 GHz bandwidth channel, and the second channel is specifically a 2.16 GHz bandwidth channel.

Therefore, by using the apparatus for implementing a decentralized clustering mechanism provided in this embodiment of the present invention, a first wireless device switches the first wireless device from a first channel to a second channel and transmits a probe frame to a second wireless device located on the second channel, where the probe frame includes a cluster probe IE; after receiving a response frame transmitted by the second wireless device, the first wireless device identifies, by using an extended cluster report IE included in the response frame, whether an empty Beacon SP exists; when the empty Beacon SP exists, the first wireless device transmits a beacon frame within the empty Beacon SP, so as to join a decentralized cluster in which the second wireless device is located. Therefore, a problem in the prior art that multi-channel clustering cannot be implemented is resolved, and efficiency of a multi-channel clustering process of a decentralized cluster is increased.

Figure 14:
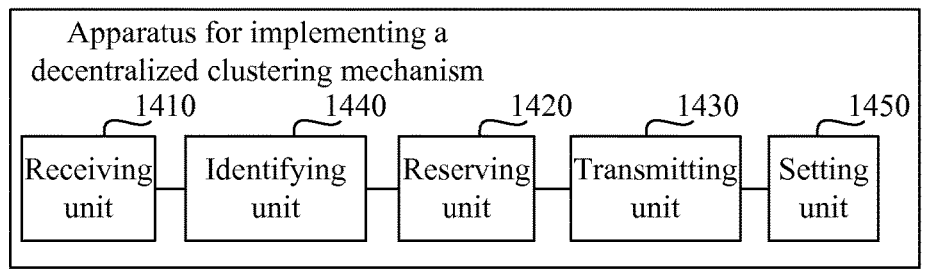
FIG. 14 is a structural block diagram of an apparatus for implementing a decentralized clustering mechanism according to Embodiment 5 of the present invention.

Correspondingly, Embodiment 5 of the present invention provides an apparatus for implementing a decentralized clustering mechanism, which is configured to implement the method for implementing a decentralized clustering mechanism in Embodiment 2. As shown in FIG. 14, the apparatus is located on a first channel, and the apparatus includes: a receiving unit 1410, a reserving unit 1420, and a transmitting unit 1430.

The receiving unit 1410 is configured to receive, within a first scheduled service period in a first data transfer interval, a probe frame transmitted by a first wireless device that switches from a second channel to the first channel, where the probe frame includes a cluster probe information element, and the cluster probe information element includes timing information that is used for enabling the apparatus to transmit a response frame in response to the probe frame.

The reserving unit 1420 is configured to: when the apparatus is already located in a decentralized cluster, reserve multiple second scheduled service periods from a second data transfer interval according to the timing information included in the cluster probe information element.

The transmitting unit 1430 is configured to transmit a response frame within the second scheduled service periods, where the response frame includes an extended cluster report information element, which is used by the first wireless device to identify, by using the extended cluster report information element, whether an empty beacon scheduled service period Beacon SP exists; when the empty Beacon SP exists, the first wireless device transmits a beacon frame within the empty Beacon SP, so as to join the decentralized cluster in which the apparatus is located.

The apparatus further includes: an identifying unit 1440, configured to identify whether the apparatus is already located in the decentralized cluster; and a setting unit 1450, configured to: when the apparatus is not located in the decentralized cluster, establish a decentralized cluster and set the apparatus as a synchronization wireless device in the decentralized cluster.

The first channel is specifically a 2.16 GHz bandwidth channel, and the second channel is specifically a 1.08 GHz bandwidth channel.

Therefore, by using the apparatus for implementing a decentralized clustering mechanism provided in this embodiment of the present invention, a first wireless device receives a probe frame transmitted by a second wireless device that has already switched to a first channel, determines a response frame according to a cluster probe IE included in the probe frame, and transmits the response frame to the second wireless device, so that the second wireless device identifies, by using an extended cluster report IE included in the response frame, whether an empty Beacon SP exists; when the empty Beacon SP exists, the second wireless device transmits a beacon frame within the empty Beacon SP, so that the second wireless device joins a decentralized cluster in which the first wireless device is located. Therefore, a problem in the prior art that multi-channel clustering cannot be implemented is resolved, and efficiency of a multi-channel clustering process of a decentralized cluster is increased.

Figure 15:
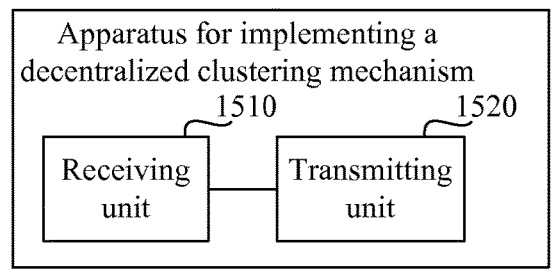
FIG. 15 is a structural block diagram of an apparatus for implementing a decentralized clustering mechanism according to Embodiment 6 of the present invention.

Correspondingly, Embodiment 6 of the present invention provides an apparatus for implementing a decentralized clustering mechanism, which is configured to implement the method for implementing a decentralized clustering mechanism in Embodiment 3. As shown in FIG. 15, the apparatus is located in a first decentralized cluster, and the apparatus includes: a receiving unit 1510 and a transmitting unit 1520.

The receiving unit 1510 is configured to receive a first beacon frame transmitted by a first synchronization wireless device located in a second decentralized cluster.

The transmitting unit 1520 is configured to: when the apparatus determines to join the second decentralized cluster, transmit a second beacon frame to a cluster member in the first decentralized cluster according to the first beacon frame within a beacon scheduled service period, where the second beacon frame includes a cluster switch announcement information element, which is used by the cluster member to identify, according to the cluster switch announcement information element, whether a beacon frame transmitted by the first synchronization wireless device is received; if the cluster member receives the beacon frame transmitted by the first synchronization wireless device, the cluster member joins the second decentralized cluster.

Both the apparatus and the first synchronization wireless device may be located on either a first channel or a second channel.

The first channel is specifically a 1.08 GHz bandwidth channel, and the second channel is specifically a 2.16 GHz bandwidth channel.

Therefore, by using the apparatus for implementing a decentralized clustering mechanism provided in this embodiment of the present invention, when a first synchronization wireless device determines to join a second decentralized cluster, the first synchronization wireless device transmits a second beacon frame to a cluster member in a first decentralized cluster according to a first beacon frame within a beacon scheduled service period, where the second beacon frame includes a cluster switch announcement IE, which is used by the cluster member to identify, according to the cluster switch announcement IE, whether the first beacon frame is received; if the cluster member receives the first beacon frame, the cluster member joins the second decentralized cluster, so as to perform maintenance and management on the formed decentralized cluster after a synchronization wireless device in the cluster is lost.

Figure 16:
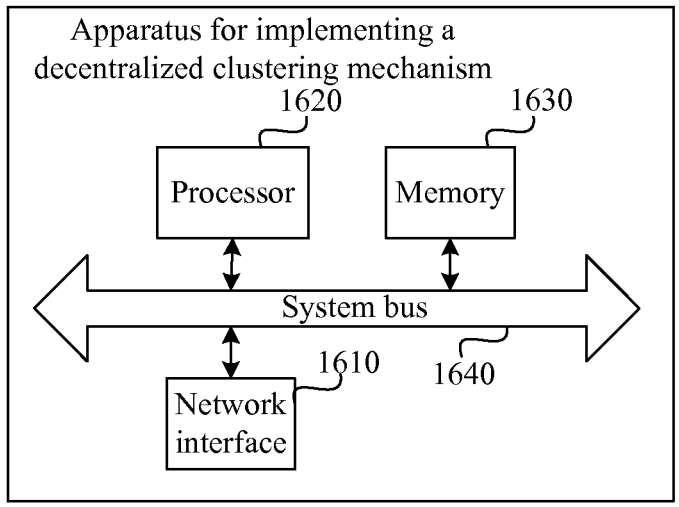
FIG. 16 is a schematic diagram of a hardware structure of an apparatus for implementing a decentralized clustering mechanism according to an embodiment of the present invention.

In addition, the apparatus for implementing a decentralized clustering mechanism provided in Embodiment 4 of the present invention may also be implemented in the following manner, so as to implement the method for implementing a decentralized clustering mechanism in Embodiment 1 of the present invention. As shown in FIG. 16, the apparatus is located on a first channel, and the apparatus includes: a network interface 1610, a processor 1620, and a memory 1630.

The network interface 1610 is configured to perform interaction and communication with a wireless device located on another channel, or a wireless device or a station on the first channel.

The memory 1630 may be a permanent memory, such as a hard disk drive and a flash memory, and the memory 1630 has a software module and a device driver. The software module can execute functions of various functional modules in the foregoing methods of the present invention, and the device driver may be a network and interface driver.

When enabled, these software components are loaded into the memory 1630; then, the processor 1620 accesses the software components and executes the following instructions:

reserving multiple first scheduled service periods from a first data transfer interval;

switching from the first channel to a second channel within the first scheduled service periods and transmitting a probe frame over the second channel, where the probe frame includes a cluster probe information element, and the cluster probe information element includes timing information that is used for enabling a wireless device located on the second channel to transmit a response frame in response to the probe frame;

reserving multiple second scheduled service periods corresponding to the first scheduled service periods from a second data transfer interval according to the timing information included in the cluster probe information element;

when the response frame transmitted by the wireless device located on the second channel is received within the second scheduled service periods, identifying, by using an extended cluster report information element included in the response frame, whether an empty beacon scheduled service period Beacon SP exists; and if the empty Beacon SP exists, transmitting a beacon frame within the empty Beacon SP, so that the apparatus joins a decentralized cluster in which the wireless device on the second channel is located.

Further, the extended cluster report information element includes cluster synchronization information and control information of the decentralized cluster in which the wireless device on the second channel is located.

Further, after the processor accesses the software components of the memory 1630, the identifying, by using an extended cluster report information element included in the response frame, whether an empty beacon scheduled service period Beacon SP exists includes:

identifying, within a Beacon SP by using the cluster synchronization information and control information of the decentralized cluster in which the wireless device on the second channel is located, whether the empty Beacon SP exists.

Further, after accessing the software components of the memory 1630, the processor executes instructions of the following process:

determining a variable beacon interval according to the cluster synchronization information and control information of the decentralized cluster in which the wireless device on the second channel is located, where the variable beacon interval is used by a transmitting unit to continue to transmit a beacon frame over the second channel according to the variable beacon interval; and switching back to the first channel according to the variable beacon interval, and transmitting the beacon frame within a beacon transmission interval on the first channel.

Further, after accessing the software components of the memory 1630, the processor executes instructions of the following process:

receiving an announcement frame transmitted by a station located on the first channel, where the announcement frame includes a cluster report information element having a cluster channel number; and reserving, on the first channel according to the cluster report information element having the cluster channel number, the multiple first scheduled service periods from the first data transfer interval, so as to identify whether the Beacon SP exists.

Further, after accessing the software components of the memory 1630, the processor executes instructions of the following process:

when the response frame transmitted by the wireless device on the second channel is not received within the second scheduled service periods, re-reserving the multiple first scheduled service periods from the first data transfer interval, and making a random adjustment to locations of the re-reserved first scheduled service periods.

Further, the first channel is specifically a 1.08 GHz bandwidth channel, and the second channel is specifically a 2.16 GHz bandwidth channel.

Therefore, by using the apparatus for implementing a decentralized clustering mechanism provided in this embodiment of the present invention, a first wireless device switches the first wireless device from a first channel to a second channel and transmits a probe frame to a second wireless device located on the second channel, where the probe frame includes a cluster probe IE; after receiving a response frame transmitted by the second wireless device, the first wireless device identifies, by using an extended cluster report IE included in the response frame, whether an empty Beacon SP exists; when the empty Beacon SP exists, the first wireless device transmits a beacon frame within the empty Beacon SP, so as to join a decentralized cluster in which the second wireless device is located. Therefore, a problem in the prior art that multi-channel clustering cannot be implemented is resolved, and efficiency of a multi-channel clustering process of a decentralized cluster is increased.

Figure 17:
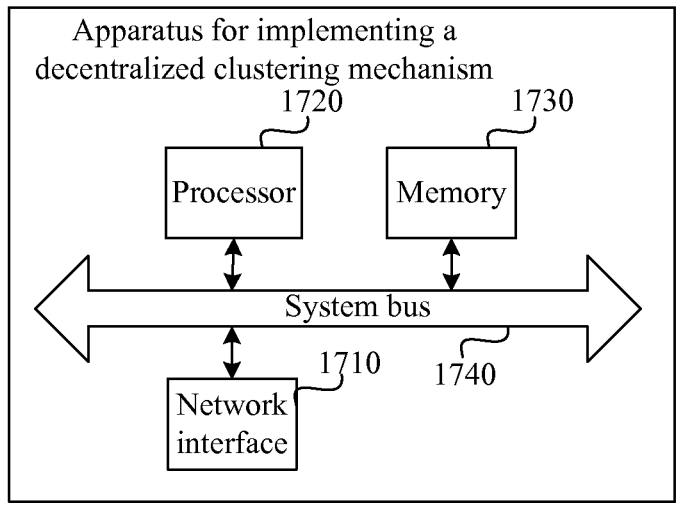
FIG. 17 is a schematic diagram of a hardware structure of another apparatus for implementing a decentralized clustering mechanism according to an embodiment of the present invention.

In addition, the apparatus for implementing a decentralized clustering mechanism provided in Embodiment 5 of the present invention may also be implemented in the following manner, so as to implement the method for implementing a decentralized clustering mechanism in Embodiment 2 of the present invention. As shown in FIG. 17, the apparatus is located on a first channel, and the apparatus includes: a network interface 1710, a processor 1720, and a memory 1730.

The network interface 1710 is configured to perform interaction and communication with a wireless device located on another channel, or a wireless device or a station on the first channel.

The memory 1730 may be a permanent memory, such as a hard disk drive and a flash memory, and the memory 1730 has a software module and a device driver. The software module can execute functions of various functional modules in the foregoing methods of the present invention, and the device driver may be a network and interface driver.

When enabled, these software components are loaded into the memory 1730; then, the processor 1720 accesses the software components and executes the following instructions:

receiving, within a first scheduled service period in a first data transfer interval, a probe frame transmitted by a first wireless device that switches from a second channel to the first channel, where the probe frame includes a cluster probe information element, and the cluster probe information element includes timing information that is used for enabling the apparatus to transmit a response frame in response to the probe frame;

when the apparatus is already located in a decentralized cluster, reserving multiple second scheduled service periods from a second data transfer interval according to the timing information included in the cluster probe information element; and transmitting a response frame within the second scheduled service periods, where the response frame includes an extended cluster report information element, which is used by the first wireless device to identify, by using the extended cluster report information element, whether an empty beacon scheduled service period Beacon SP exists; when the empty Beacon SP exists, the first wireless device transmits a beacon frame within the empty Beacon SP, so as to join the decentralized cluster in which the apparatus is located.

Further, after accessing the software components of the memory 1730, the processor executes instructions of the following process:

identifying whether the apparatus is already located in the decentralized cluster; and when the apparatus is not located in the decentralized cluster, establishing a decentralized cluster and setting the apparatus as a synchronization wireless device in the decentralized cluster.

Further, the first channel is specifically a 2.16 GHz bandwidth channel, and the second channel is specifically a 1.08 GHz bandwidth channel.

Therefore, by using the apparatus for implementing a decentralized clustering mechanism provided in this embodiment of the present invention, a first wireless device receives a probe frame transmitted by a second wireless device that has already switched to a first channel, determines a response frame according to a cluster probe IE included in the probe frame, and transmits the response frame to the second wireless device, so that the second wireless device identifies, by using an extended cluster report IE included in the response frame, whether an empty Beacon SP exists; when the empty Beacon SP exists, the second wireless device transmits a beacon frame within the empty Beacon SP, so that the second wireless device joins a decentralized cluster in which the first wireless device is located. Therefore, a problem in the prior art that multi-channel clustering cannot be implemented is resolved, and efficiency of a multi-channel clustering process of a decentralized cluster is increased.

Figure 18:
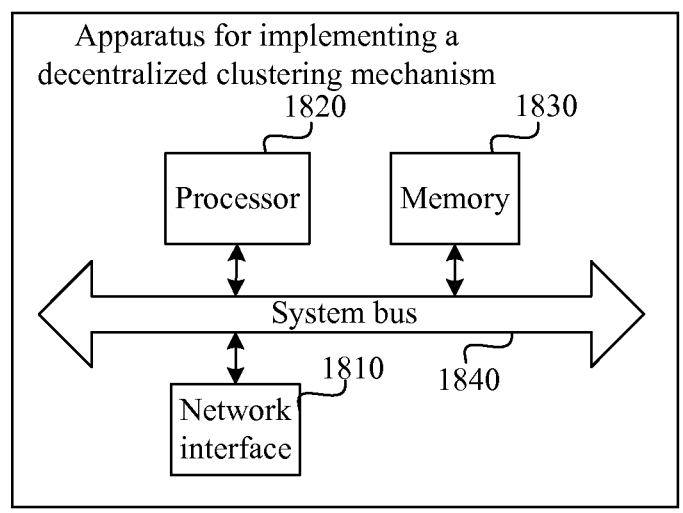
FIG. 18 is a schematic diagram of a hardware structure of still another apparatus for implementing a decentralized clustering mechanism according to an embodiment of the present invention.

In addition, the apparatus for implementing a decentralized clustering mechanism provided in Embodiment 6 of the present invention may also be implemented in the following manner, so as to implement the method for implementing a decentralized clustering mechanism in Embodiment 3 of the present invention. As shown in FIG. 18, the apparatus is located in a first decentralized cluster, and the apparatus includes: a network interface 1810, a processor 1820, and a memory 1830.

The network interface 1810 is configured to perform interaction and communication with a wireless device located on another channel, or a wireless device or a station on this channel.

The memory 1830 may be a permanent memory, such as a hard disk drive and a flash memory, and the memory 1830 has a software module and a device driver. The software module can execute functions of various functional modules in the foregoing methods of the present invention, and the device driver may be a network and interface driver.

When enabled, these software components are loaded into the memory 1830; then, the processor 1820 accesses the software components and executes the following instructions:

receiving a first beacon frame transmitted by a first synchronization wireless device located in a second decentralized cluster; and when the apparatus determines to join the second decentralized cluster, transmitting a second beacon frame to a cluster member in the first decentralized cluster according to the first beacon frame within a beacon scheduled service period, where the second beacon frame includes a cluster switch announcement information element, which is used by the cluster member to identify, according to the cluster switch announcement information element, whether a beacon frame transmitted by the first synchronization wireless device is received; if the cluster member receives the beacon frame transmitted by the first synchronization wireless device, the cluster member joins the second decentralized cluster.

Further, both the apparatus and the first synchronization wireless device may be located on either a first channel or a second channel.

Further, the first channel is specifically a 1.08 GHz bandwidth channel, and the second channel is specifically a 2.16 GHz bandwidth channel.

Therefore, by using the apparatus for implementing a decentralized clustering mechanism provided in this embodiment of the present invention, when a first synchronization wireless device determines to join a second decentralized cluster, the first synchronization wireless device transmits a second beacon frame to a cluster member in a first decentralized cluster according to a first beacon frame within a beacon scheduled service period, where the second beacon frame includes a cluster switch announcement IE, which is used by the cluster member to identify, according to the cluster switch announcement IE, whether the first beacon frame is received; if the cluster member receives the first beacon frame, the cluster member joins the second decentralized cluster, so as to perform maintenance and management on the formed decentralized cluster after a synchronization wireless device in the cluster is lost.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a CD-ROM, or a storage medium in any other forms well-known in the art.

In the foregoing specific implementation manners, the objective, technical solutions, and benefits of the present invention are further described in detail. It should be understood that the foregoing descriptions are merely specific implementation manners of the present invention, but are not intended to limit the protection scope of the present invention. Any modification, equivalent replacement, or improvement made without departing from the spirit and principle of the present invention should fall within the protection scope of the present invention.

What is claimed is:

1. A method for implementing a decentralized clustering mechanism, wherein the method comprises:
    reserving, by a first wireless device located on a first channel, multiple first scheduled service periods from a first data transfer interval;
    switching, by the first wireless device, the first wireless device to a second channel within the first scheduled service periods, and transmitting a probe frame over the second channel, wherein the probe frame comprises a cluster probe information element, and the cluster probe information element comprises timing information that is used for enabling a second wireless device located on the second channel to transmit a response frame in response to the probe frame;
    reserving, by the first wireless device, multiple second scheduled service periods corresponding to the first scheduled service periods from a second data transfer interval according to the timing information comprised in the cluster probe information element;
    when the response frame transmitted by the second wireless device is received within the second scheduled service periods, identifying, by the first wireless device by using an extended cluster report information element comprised in the response frame, whether an empty beacon scheduled service period Beacon SP exists; and
    if the empty Beacon SP exists, transmitting, by the first wireless device, a beacon frame within the empty Beacon SP, so that the first wireless device joins a decentralized cluster in which the second wireless device is located.

2. The method according to claim 1, wherein the extended cluster report information element comprises cluster synchronization information and cluster control information of the decentralized cluster in which the second wireless device is located; and
    the identifying, by the first wireless device by using an extended cluster report information element comprised in the response frame, whether an empty beacon scheduled service period Beacon SP exists specifically comprises:
    identifying, within a Beacon SP by the first wireless device by using the cluster synchronization information and control information of the decentralized cluster in which the second wireless device is located, whether the empty Beacon SP exists.

3. The method according to claim 2, after the transmitting, by the first wireless device, a beacon frame within the empty Beacon SP, so that the first wireless device joins a decentralized cluster in which the second wireless device is located, further comprising:
    determining, by the first wireless device, a variable beacon interval according to the cluster synchronization information and control information of the decentralized cluster in which the second wireless device is located, wherein the variable beacon interval is used by the first wireless device to continue to transmit a beacon frame over the second channel according to the variable beacon interval; and
    switching, by the first wireless device, the first wireless device back to the first channel according to the variable beacon interval, and transmitting the beacon frame within a beacon transmission interval on the first channel.

4. The method according to claim 1, before the reserving, by a first wireless device located on a first channel, multiple first scheduled service periods from a first data transfer interval, further comprising:
    receiving, by the first wireless device, an announcement frame transmitted by a station located on the first channel, wherein the announcement frame comprises a cluster report information element having a cluster channel number; and
    reserving, on the first channel by the first wireless device according to the cluster report information element having the cluster channel number, the multiple first scheduled service periods from the first data transfer interval, so as to identify whether the empty Beacon SP exists.

5. The method according to claim 1, wherein the method further comprises:
    when the response frame transmitted by the second wireless device is not received within the second scheduled service periods, re-reserving, by the first wireless device, the multiple first scheduled service periods from the first data transfer interval, and making a random adjustment to locations of the re-reserved first scheduled service periods.

6. The method according to claim 1, wherein the first channel is specifically a 1.08 GHz bandwidth channel, and the second channel is specifically a 2.16 GHz bandwidth channel.

7. A method for implementing a decentralized clustering mechanism, wherein the method comprises:
    receiving, by a first wireless device located on a first channel within a first scheduled service period in a first data transfer interval, a probe frame transmitted by a second wireless device that switches from a second channel to the first channel, wherein the probe frame comprises a cluster probe information element, and the cluster probe information element comprises timing information that is used for enabling the first wireless device to transmit a response frame in response to the probe frame;
    when the first wireless device is already located in a decentralized cluster, reserving, by the first wireless device, multiple second scheduled service periods from a second data transfer interval according to the timing information comprised in the cluster probe information element; and
    transmitting, by the first wireless device, a response frame within the second scheduled service periods, wherein the response frame comprises an extended cluster report information element, which is used by the second wireless device to identify, by using the extended cluster report information element, whether an empty beacon scheduled service period Beacon SP exists; when the empty Beacon SP exists, the second wireless device transmits a beacon frame within the empty Beacon SP, so that the second wireless device joins the decentralized cluster in which the first wireless device is located.

8. The method according to claim 7, after the receiving, by a first wireless device located on a first channel within a first scheduled service period in a first data transfer interval, a probe frame transmitted by a second wireless device that switches from a second channel to the first channel, further comprising:
identifying, by the first wireless device, whether the first wireless device is already located in the decentralized cluster; and
when the first wireless device is not located in the decentralized cluster, establishing, by the first wireless device, a decentralized cluster, and setting the first wireless device as a synchronization wireless device in the decentralized cluster.

9. The method according to claim 7, wherein the first channel is specifically a 2.16 GHz bandwidth channel, and the second channel is specifically a 1.08 GHz bandwidth channel.

10. An apparatus for implementing a decentralized clustering mechanism, wherein the apparatus for implementing a decentralized clustering mechanism is located on a first channel, and the apparatus for implementing a decentralized clustering mechanism comprises:
a first reserving unit, configured to reserve multiple first scheduled service periods from a first data transfer interval;
a transmitting unit, configured to switch from the first channel to a second channel within the first scheduled service periods and transmit a probe frame over the second channel, wherein the probe frame comprises a cluster probe information element, and the cluster probe information element comprises timing information that is used for enabling a wireless device located on the second channel to transmit a response frame in response to the probe frame;
a second reserving unit, configured to reserve multiple second scheduled service periods corresponding to the first scheduled service periods from a second data transfer interval according to the timing information comprised in the cluster probe information element; and
an identifying unit, configured to: when the response frame transmitted by the wireless device located on the second channel is received within the second scheduled service periods, identify, by using an extended cluster report information element comprised in the response frame, whether an empty beacon scheduled service period Beacon SP exists, wherein
the transmitting unit is further configured to: if the empty Beacon SP exists, transmit a beacon frame within the empty Beacon SP, so that the apparatus joins a decentralized cluster in which the wireless device on the second channel is located.

11. The apparatus according to claim 10, wherein the extended cluster report information element received by the identifying unit comprises cluster synchronization information and control information of the decentralized cluster in which the wireless device on the second channel is located; and
the identifying unit is specifically configured to identify, within a Beacon SP by using the cluster synchronization information and control information of the decentralized cluster in which the wireless device on the second channel is located, whether the empty Beacon SP exists.

12. The apparatus according to claim 11, wherein the apparatus further comprises:
a determining unit, configured to determine a variable beacon interval according to the cluster synchronization information and control information of the decentralized cluster in which the wireless device on the second channel is located, wherein the variable beacon interval is used by the transmitting unit to continue to transmit a beacon frame over the second channel according to the variable beacon interval, wherein
the transmitting unit is further configured to switch back to the first channel according to the variable beacon interval and transmit the beacon frame within a beacon transmission interval on the first channel.

13. The apparatus according to claim 10, wherein the apparatus further comprises:
a receiving unit, configured to receive an announcement frame transmitted by a station located on the first channel, wherein the announcement frame comprises a cluster report information element having a cluster channel number, wherein
the first reserving unit is specifically configured to reserve, on the first channel according to the cluster report information element having the cluster channel number, the multiple first scheduled service periods from the first data transfer interval, so as to identify whether the empty Beacon SP exists.

14. The apparatus according to claim 10, wherein the first reserving unit is further configured to:
when the response frame transmitted by the wireless device on the second channel is not received within the second scheduled service periods, re-reserve the multiple first scheduled service periods from the first data transfer interval and make a random adjustment to locations of the re-reserved first scheduled service periods.

15. The apparatus according to claim 10, wherein the first channel is specifically a 1.08 GHz bandwidth channel, and the second channel is specifically a 2.16 GHz bandwidth channel.

16. An apparatus for implementing a decentralized clustering mechanism, wherein the apparatus for implementing a decentralized clustering mechanism is located on a first channel, and the apparatus for implementing a decentralized clustering mechanism comprises:
a receiving unit, configured to receive, within a first scheduled service period in a first data transfer interval, a probe frame transmitted by a first wireless device that switches from a second channel to the first channel, wherein the probe frame comprises a cluster probe information element, and the cluster probe information element comprises timing information that is used for enabling the apparatus to transmit a response frame in response to the probe frame;
a reserving unit, configured to: when the apparatus is already located in a decentralized cluster, reserve multiple second scheduled service periods from a second data transfer interval according to the timing information comprised in the cluster probe information element; and a transmitting unit, configured to transmit a response frame within the second scheduled service periods, wherein the response frame comprises an extended cluster report information element, which is used by the first wireless device to identify, by using the extended cluster report information element, whether an empty beacon scheduled service period Beacon SP exists; when the empty Beacon SP exists, the first wireless device transmits a beacon frame within the empty Beacon SP, so as to join the decentralized cluster in which the apparatus is located.

17. The apparatus according to claim 16, wherein the apparatus further comprises:

an identifying unit, configured to identify whether the apparatus is already located in the decentralized cluster; and a setting unit, configured to: when the apparatus is not located in the decentralized cluster, establish a decentralized cluster and set the apparatus as a synchronization wireless device in the decentralized cluster.

18. The apparatus according to claim 16, wherein the first channel is specifically a 2.16 GHz bandwidth channel, and the second channel is specifically a 1.08 GHz bandwidth channel.

* * * * *